(12) United States Patent
James et al.

(10) Patent No.: US 8,484,282 B2
(45) Date of Patent: Jul. 9, 2013

(54) HIGH-SPEED CONTENT TRANSFORMATION ENGINE

(75) Inventors: Zackary A. James, Raleigh, NC (US); Thomas O. Rowe, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 3542 days.

(21) Appl. No.: 10/103,400

(22) Filed: Mar. 21, 2002

(65) Prior Publication Data

US 2003/0217169 A1 Nov. 20, 2003

(51) Int. Cl.
*G06F 15/16* (2006.01)
(52) U.S. Cl.
USPC .............................. 709/203; 709/217; 709/223
(58) Field of Classification Search
USPC .......... 709/217, 219, 229, 203, 223; 715/500; 711/118
See application file for complete search history.

(56) References Cited

U.S. PATENT DOCUMENTS

| | | | |
|---|---|---|---|
| 4,722,050 A | 1/1988 | Lee et al. | 364/200 |
| 5,251,314 A | 10/1993 | Williams | 395/600 |
| 5,307,451 A | 4/1994 | Clark | 395/127 |
| 5,740,430 A | 4/1998 | Rosenberg et al. | 395/616 |
| 5,748,961 A * | 5/1998 | Hanna et al. | 717/145 |
| 6,012,071 A | 1/2000 | Krishna et al. | 707/522 |
| 6,012,098 A | 1/2000 | Bayeh et al. | 709/246 |
| 6,021,426 A | 2/2000 | Douglis et al. | 709/200 |
| 6,108,655 A | 8/2000 | Schleimer et al. | 707/10 |
| 6,122,666 A | 9/2000 | Beurket et al. | 709/226 |
| 6,154,738 A | 11/2000 | Call | 707/4 |
| 6,192,382 B1 | 2/2001 | Lafer et al. | 707/513 |
| 6,199,082 B1 | 3/2001 | Ferrel et al. | 707/522 |
| 6,199,107 B1 | 3/2001 | Dujari | 709/219 |
| 6,219,818 B1 | 4/2001 | Freivald et al. | 714/799 |
| 6,249,844 B1 | 6/2001 | Schloss et al. | 711/122 |
| 6,282,707 B1 | 8/2001 | Isozaki | 717/9 |
| 6,311,197 B2 | 10/2001 | Mighdoll et al. | 707/513 |
| 6,407,680 B1 * | 6/2002 | Lai et al. | 341/50 |
| 6,654,807 B2 * | 11/2003 | Farber et al. | 709/225 |
| 6,763,460 B1 * | 7/2004 | Hild et al. | 713/161 |
| 7,003,555 B1 * | 2/2006 | Jungck | 709/219 |
| 2001/0014900 A1 | 8/2001 | Brauer et al. | 707/513 |

(Continued)

FOREIGN PATENT DOCUMENTS

WO WO01/18657 3/2001

OTHER PUBLICATIONS

Parameterized XSL Style Sheets, *Research Disclosure*, pp. 1009-1011, (Jul. 1999).

(Continued)

*Primary Examiner* — Lashonda Jacobs
(74) *Attorney, Agent, or Firm* — Steven M. Greenberg, Esq.; Carey, Rodriquez, Greenberg & O'Keefe

(57) ABSTRACT

A high-speed content transformation method, system and apparatus. The method can include inspecting a request for transcoded content to determine input documents required to produce the requested transcoded content; determining whether the input documents have been characterized as standalone, and further determining freshness criteria for the input documents which are determined to have been characterized as standalone; locating in cache storage previously generated transcoded content corresponding to the input documents determined to have been characterized as standalone; and, serving the previously generated transcoded content in response to the request rather than generating the requested transcoded content using the input documents where the previously transcoded content meets the freshness criteria.

13 Claims, 3 Drawing Sheets

U.S. PATENT DOCUMENTS

| | | | |
|---|---|---|---|
| 2001/0032084 A1 | 10/2001 | Day | 704/270.1 |
| 2001/0034743 A1 | 10/2001 | Thomas | 707/501.1 |
| 2001/0037490 A1 | 11/2001 | Chiang | 717/2 |
| 2001/0047394 A1 | 11/2001 | Kloba et al. | 709/217 |

OTHER PUBLICATIONS

A Process for Optimized Application of XSL Stylesheets for Use With Partially Static XML Data Streams, *Research Disclosure*, p. 704, (Apr. 2000).

Generating Java Code From an XML Schema With an XSL Stylesheet, *Research Disclosure*, pp. 1036-1037, (Jun. 2001).

K. Cagle, How to Find the Best XML Server for You, *XML*, < http://www.xmlmag.com/upload/free/features/xml/2000/04fal00/kc2_0004/kc2_0004.asp>, (Nov. 27, 2001).

\* cited by examiner

HIGH-SPEED CONTENT TRANSFORMATION ENGINE

BACKGROUND OF THE INVENTION

1. Statement of the Technical Field

The present invention relates to a content transformation engine and more particularly to a caching technique utilized in conjunction with a content transformation engine.

2. Description of the Related Art

The growth of the public network such as the Internet has driven corresponding, but exponentially increasing, growth in the generation and distribution of content across the public network. Initially, content had been formatted in one of a handful of content formats and distributed accordingly. Still, with the advent of the World Wide Web and the Web browser, a movement emerged in which content distributed over the Internet could be uniformly formatted using markup tags as in the hypertext markup language (HTML). Nevertheless, as it became apparent that the substance of content ought to remain separate from the formatting and presentation elements of the content, new formatting technologies evolved. Thus, the idea of transforming content from one format to another followed.

In the field of global data communications, the sharing of content can be achieved by expressing that data using the extensible markup language (XML). Once expressed in XML, content can be sampled by multiple interested parties before ultimately becoming consumed. For example, XML content generated by a third-tier server can be sampled by a transcoding publisher acting as a reverse proxy. In consequence, the XML formatted content can be transformed using extensible stylesheet (XSL) technologies into a renderable XML-based grammar such as XHTML or WAP/WML. This renderable XML ultimately can be consumed by a client browser or a pervasive device.

XSL has emerged as a popular and effective model for transforming an XML document into one of another XML document, or a rendered markup language form of the document, for instance WML, VoxML, HTML, etc. Unfortunately, XSL, too, is not without its inherent deficiencies. One significant disadvantage associated with XSL can include the substantial overhead incurred during the transformation of an XML document using XSL. In particular, this overhead can result from the interpretation of scripting as a primary model of operation for XSL technologies. Also, document object model (DOM) traversal and template matching operations within an XSL stylesheet can further complicate matters.

The degree of overhead incurred during an XSL transformation can be measured as a factor of the length of the XML data, the complexity of the transformation rules specified in a XSL stylesheet, and the availability of all constituent entities of the XML document and XSL stylesheet. Notably, network latencies can form a prominent portion of the complexity computation when considering the retrieval of content across a network required during the transformation process. While caching technologies have proven effective in combating network latencies in the distribution of content on the Internet, in the case of XML data, it is during the transformation that overhead can be experienced more so than during the distribution of the content.

SUMMARY OF THE INVENTION

The present invention overcomes the limitations of conventional transformation engines and provides a novel and non-obvious method, system and apparatus for processing high-speed transformations utilizing caching technology. In particular, in accordance with the inventive arrangements, a caching content transformation engine can include cache storage configured to store transcoded content; a content transformation engine configured to transcode content based upon input content and input transformation stylesheet documents; and, caching logic.

The caching logic can be configured to respond to requests for transcoded content by retrieving the requested transcoded content from the cache storage without first generating the requested transcoded content in the content transformation engine. Importantly, the caching logic can retrieve the requested transcoded content from cache storage with first generating the requested transcoded content in the content transformation engine where freshness and standalone criteria for the requested transcoded content can be met by the requested transcoded content and its associated input content and input transformation stylesheet documents.

Notably, in one aspect of the invention, the caching content transformation engine can configured for disposition in a reverse proxy cache server. Also, in another aspect of the invention, the content transformation engine can be an XML-XSL transcoding engine. Finally, in yet another aspect of the invention, the input content and input transformation stylesheet documents can be XML and XSL documents, respectively.

A high-speed content transformation method can include inspecting a request for transcoded content to determine input documents required to produce the requested transcoded content; determining whether the input documents have been characterized as standalone, and further determining freshness criteria for the input documents which are determined to have been characterized as standalone; locating in cache storage previously generated transcoded content corresponding to the input documents determined to have been characterized as standalone; and, serving the previously generated transcoded content in response to the request rather than generating the requested transcoded content using the input documents where the previously transcoded content meets the freshness criteria.

In one aspect of the high-speed content transformation method, the requested transcoded content can be generated using the input documents where either the previously transcoded content fails to meet the freshness criteria, where the previously generated transcoded content cannot be located in the cache storage, or where any one of the input documents has been characterized as not being standalone. Subsequently, the generated requested transcoded content can be cached in the cache storage. In that regard, the caching step can include forming a cache key based upon identifiable characteristics of the input documents; and, storing the generated requested transcoded content in the cache storage in a manner in which the stored generated requested transcoded content can be retrieved by reference to the formed cache key.

The forming step can include the step of forming a cache key based upon one of a combination of uniform resource locators (URLs) which reference each of the input documents, a combination of document object model (DOM) hashes which reference each of the input documents, and a combination of a URL and DOM hash which reference individual ones of the input documents. Also, the inspecting step can include the step of inspecting a request for transcoded content to determine XML and XSL input documents required to produce the requested transcoded content.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a high-speed transformation engine. In accordance with the present invention, a high-speed transformation engine can respond to requests for transformed content by determining whether the base document and its associated transformation stylesheet required to produce the transformed content are standalone components. If so, the high-speed transformation engine can compute freshness data based upon the freshness of the base document and the transformation stylesheet. An associated transformed document can be located in the cache and, if the freshness of the located document meets the freshness required by the document and transformation stylesheet, the located document can be served to the requestor rather than producing a transformed document in the transformation engine.

Figure 1:
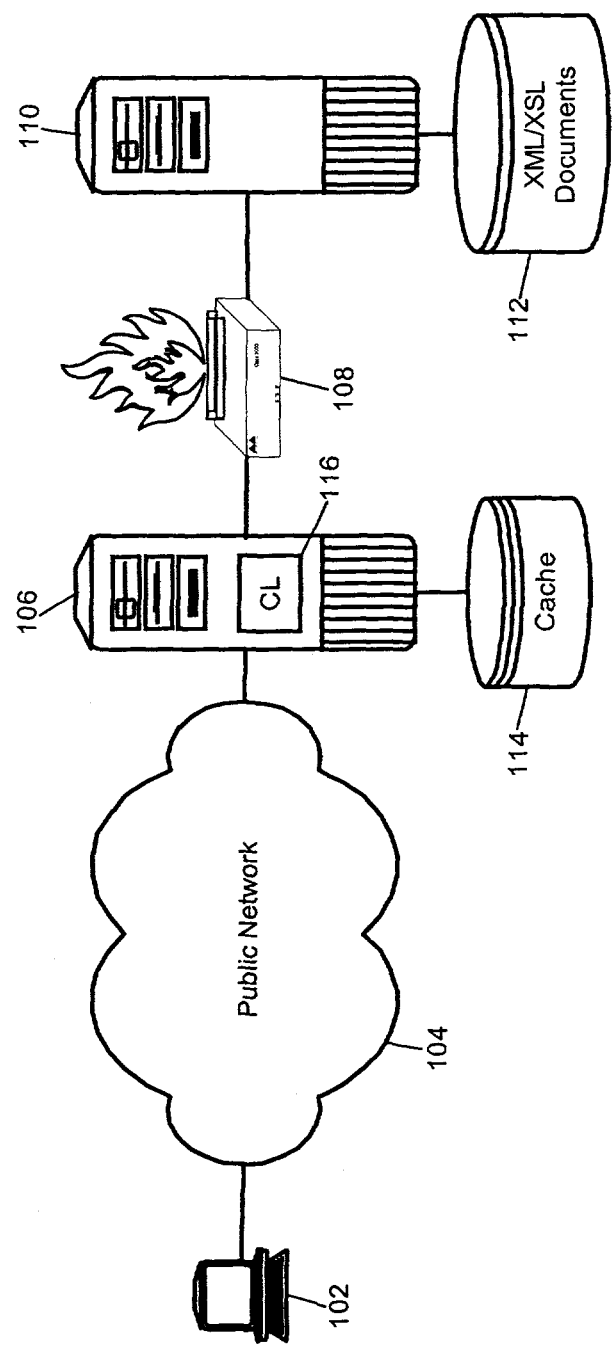
FIG. 1 is a schematic illustration of a content distribution network including a caching content server in which the caching logic of the present invention can be disposed.

FIG. 1 is a schematic illustration of a content distribution network. The content distribution network can include a content server 110 configured to serve content stored in fixed storage 112 to requesting network nodes. In the present invention, the content stored in fixed storage 112 and served by the content server 110 can be XML formatted documents which can be transformed into other formats according to instructions included in corresponding XSL stylesheet documents. Still, the invention is not strictly limited to XML/XSL transformations and the method and system of the invention can provide the advantages described herein by virtue of its operation in similar fashion upon any construct similar to the XML/XSL content transformation paradigm.

As will be recognized by one skilled in the art, the content server 110 can be positioned behind a firewall 108 and can be accessed by reverse proxy server 106 over a secure link through the firewall 108. The reverse proxy server 106 can fulfill not only the security requirements normally associated with the reverse proxy server architecture, but also, the reverse proxy server 106 can act as a content cache for the content served by the content server 110. In that regard, the reverse proxy server 106 can be configured with a local cache 114. Still, the invention is not limited strictly to a reverse proxy server architecture, and differing architectures can be accommodated in accordance with the present invention, including those architectures where only a caching proxy is provided for the content server 110 in the absence of additional network infrastructure.

In operation, a client process 102 can request transformed content from the content server 110. Inasmuch as a caching reverse proxy server 106 has been deployed therebetween, in actuality, the client process 102 will have requested transformed content from the caching reverse proxy server 106, believing the caching reverse proxy server 106 to be the content server 110. The caching reverse proxy server 106 can include caching logic 116 which can determine which XML document or documents, and which XSL document or documents are required to generate the requested transformed content.

If the caching logic 116 determines that the XML document and a XSL document are characterized as "standalone", as is well-known in the art, the content freshness requirements of each can be determined. Previously transformed content based upon the XML document and the XSL document can be located in cache storage 114. Based upon the freshness requirements of the XML document and the XSL document, it can be determined whether located transformed content satisfies the freshness requirements. If so, the located transformed content can be returned to the client process 102 over the public network 104. Otherwise, the XML document and the XSL transformation stylesheet can be retrieved from the content server 110 through the firewall 108 and the caching reverse proxy server 106 can undertake the transformation of the XML document based upon the XSL transformation stylesheet.

Figure 2:
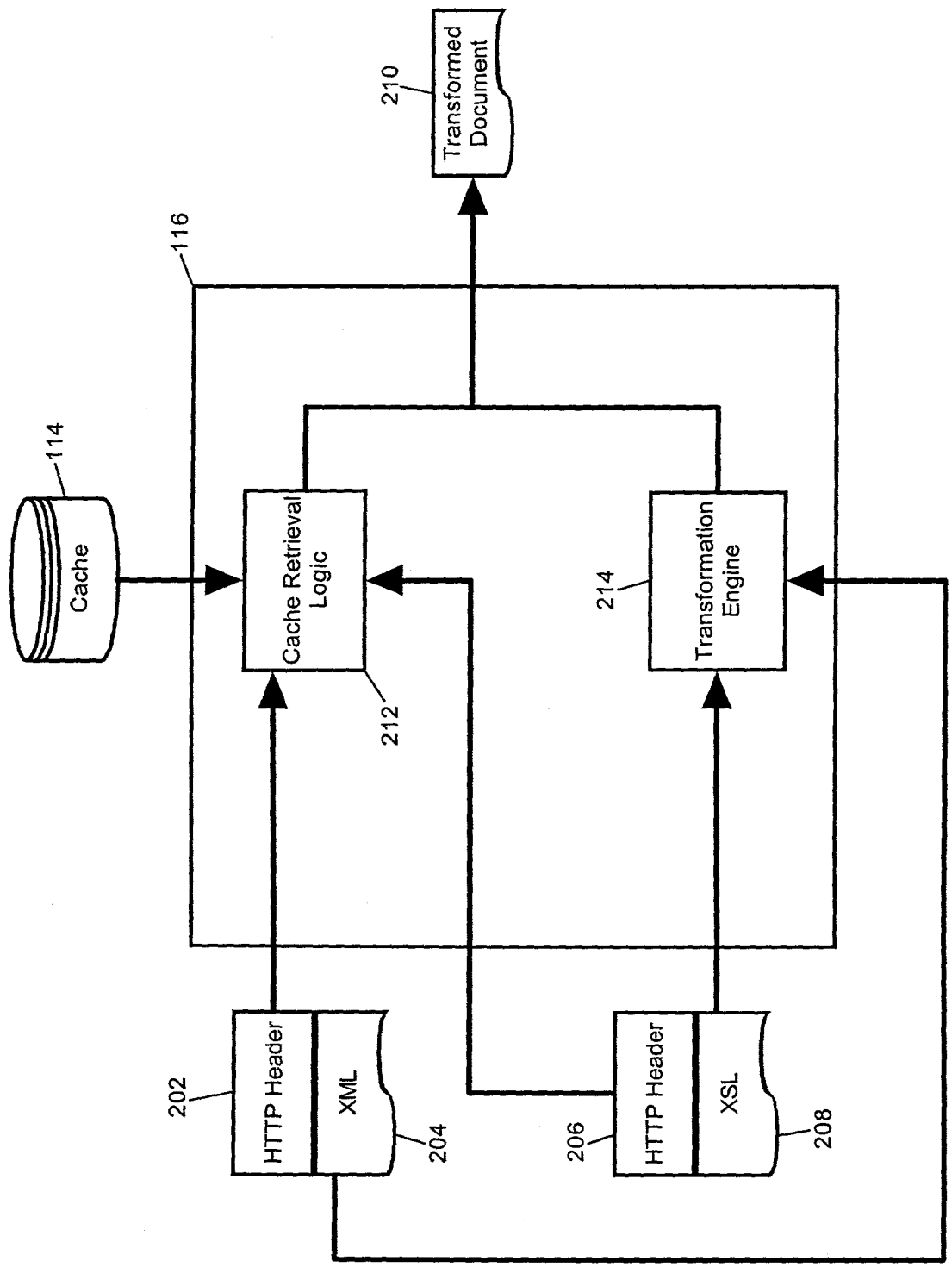
FIG. 2 is a block diagram of the caching logic of FIG. 1.

FIG. 2 is a block diagram of the caching logic 116 of FIG. 1. Responsive to the receipt of a request for transformed content, cache retrieval logic 212, in or in association with the caching logic 116, can inspect the implicated XML and XSL documents 204, 208 to determine whether the XML and XSL documents 204, 208 have been characterized as standalone. Specifically, as is well known in the art, the declaration statement of each can provide explicit indication of the standalone characterization of the respective document.

If it is determined that the XML and XSL documents 204, 208 are standalone, freshness requirements can be further determined for each of the XML and XSL documents 204, 208. For example, in one aspect of the invention, freshness data encapsulated in the HTTP headers 202, 206 for each of the XML and XSL documents 204, 208 can be inspected. As is well known in the art, HTTP headers 202, 206 can include "expires" and "last modified" information which can be useful in this regard. Once the freshness requirements for the XML and XSL documents 204, 208 have been determined, previously transcoded content can be located in the cache storage 114 which corresponds to the XML and XSL documents 204, 208.

Importantly, the freshness of the located transcoded content can be computed based upon the freshness requirements of the XML and XSL documents 204, 208. If the freshness of the located transcoded content compares favorably to the freshness requirements of the XML and XSL documents 204, 208, the located transcoded content can be served to the requesting process as the transcoded document 210 without first undertaking a transcoding process in the transformation engine 214. Otherwise, where the XML and XSL documents 204, 208 fail to meet the standalone criteria, or where the located transcoded content similarly fails to meet the freshness criteria, the XML and XSL documents 204, 208 can be used in the transformation engine 214 to produce the transcoded document 210.

Figure 3:
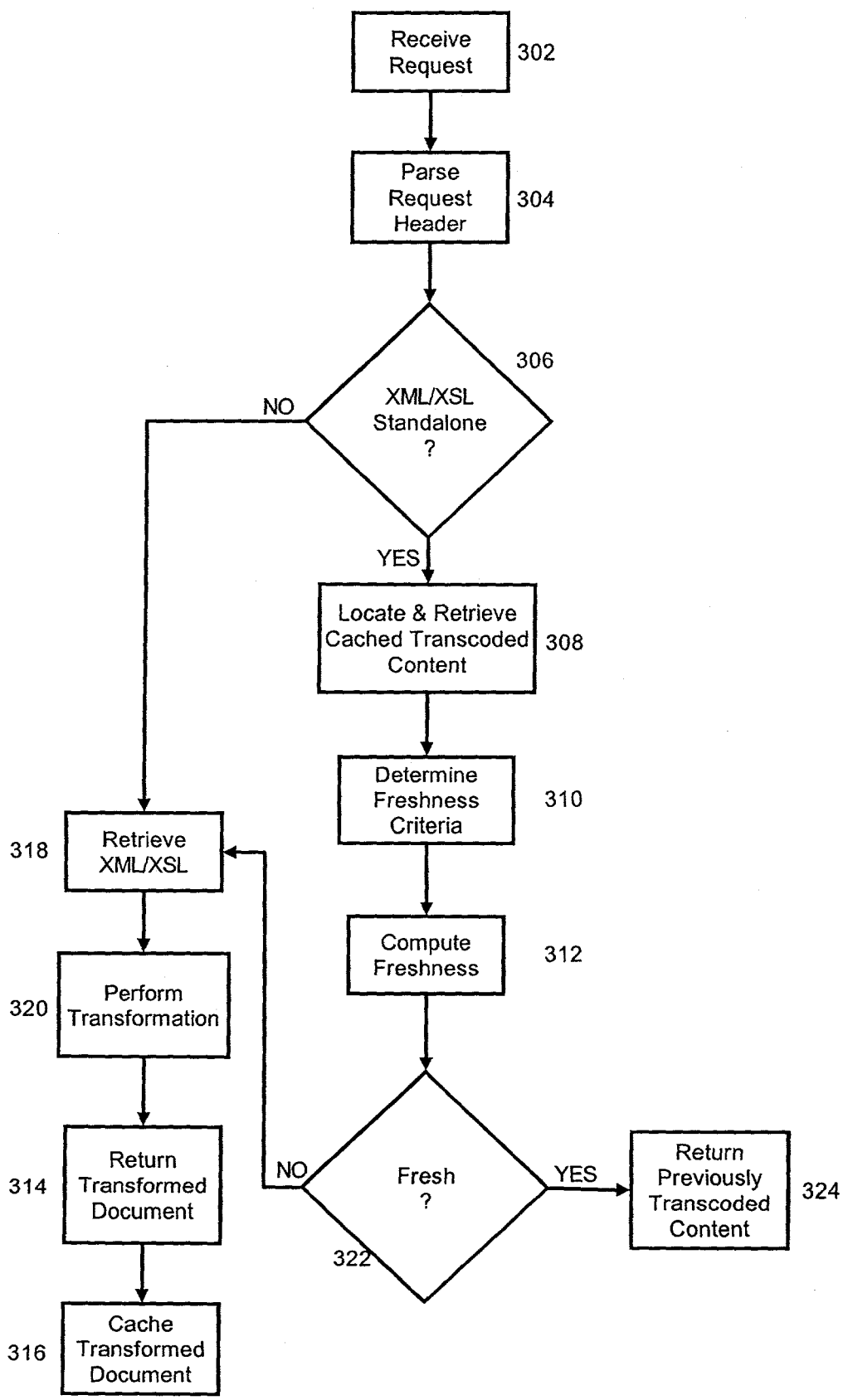
FIG. 3 is a flow chart illustrating a caching and cache retrieval process for use in the caching logic of FIGS. 1 and 2.

FIG. 3 is a flow chart illustrating a caching and cache retrieval process for use in the caching logic 116 of FIGS. 1 and 2. Beginning in block 302, a request can be received in the caching logic for transformed content. In block 304, the header of the request can be inspected to determine the identity of the XML and XSL documents required to undertake the requested transformation. Subsequently, in decision block 306 the identified XML and XSL documents can be inspected to ensure that each has been characterized as standalone.

If, in decision block 306 it is determined that one or both of the XML and XSL documents have not been characterized as standalone, in block 318 the XML and XSL documents can be retrieved and in block 320 the XML and XSL documents can be subjected to the transcoding process. The transcoding process, as one skilled in the art will recognize, can result in the requested transformed document which in block 314 can be returned to the requesting process.

By comparison, if in decision block 306 it is determined that one or both of the XML and XSL documents have been characterized as standalone, in block 308, cached transcoded content corresponding to the XML and XSL documents can be located and retrieved from cache storage. In block 310 the freshness requirements of each of the XML and XSL documents can be determined. Specifically, in one exemplary aspect of the present invention, the headers of each of the XML and XSL documents can be reviewed to identify either an "expires" attribute, or a "last updated" attribute. In any event, once the freshness requirements of the XML and XSL documents have been determined, in block 312 the freshness of cached transcoded content can be computed based upon the freshness requirements of the XML and XSL documents.

In decision block 322, if the cached transcoded content is determined not to be fresh, as in the case where one or both of the XML and XSL documents are characterized as not being standalone, in block 318 the XML and XSL documents can be retrieved and in block 320 the XML and XSL documents can be subjected to the transcoding process. In contrast, if the cached transcoded content is determined to be fresh, in block 324 the cached transcoded content can be returned to the requesting process.

Importantly, where the transcoded content cannot be served directly from cache storage, in block 316 the transcoded content can be cached in cache storage so that subsequent requests for the transcoded content can be satisfied from the cache storage without requiring the overhead of the transcoding process. In one aspect of the invention, the transcoded content can be cached using a cache key derived from the source XML and XSL documents. For example, the cache key can be formed from a combination of the uniform resource locators (URLs) for each document. Alternatively, the cache key can be formed from a combination of the document object model (DOM) hashes for each document. Finally, the cache key can be formed from a combination of URL and DOM hashes for the documents. In any case, the freshness level of the cached transcoded content can be indicated based upon the freshness of the source XML and XSL documents.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A caching content transformation engine comprising:
    cache storage configured to store transcoded content;
    a content transformation engine configured to transcode content based upon input content and input transformation stylesheet documents; and,
    caching logic configured to respond to requests for transcoded content by retrieving said requested transcoded content from said cache storage without first generating said requested transcoded content in said content transformation engine, where freshness and standalone criteria for said requested transcoded content can be met by said requested transcoded content and its associated input content and input transformation stylesheet documents.

2. The caching content transformation engine of claim 1, wherein the caching content transformation engine is configured for disposition in a reverse proxy cache server.

3. The caching content transformation engine of claim 1, wherein said content transformation engine is an XML-XSL transcoding engine and said input content and input transformation stylesheet documents are XML and XSL documents, respectively.

4. A high-speed content transformation method comprising the steps of:
    inspecting, by a computer system, a request for transcoded content to determine input documents required to produce said requested transcoded content;
    determining, by a computer system, whether said input documents have been characterized as standalone, and further determining freshness criteria for said input documents which are determined to have been characterized as standalone;
    locating in cache storage previously generated transcoded content corresponding to said input documents determined to have been characterized as standalone; and,
    serving said previously generated transcoded content in response to said request rather than generating said requested transcoded content using said input documents where said previously transcoded content meets said freshness criteria.

5. The high-speed content transformation method of claim 4, further comprising the steps of:
    generating said requested transcoded content using said input documents where either said previously transcoded content fails to meet said freshness criteria, where said previously generated transcoded content cannot be located in said cache storage, or where any one of said input documents has been characterized as not being standalone; and,
    caching said generated requested transcoded content in said cache storage.

6. The high-speed content transformation method of claim 5, wherein said step of caching comprises the steps of:
    forming a cache key based upon identifiable characteristics of said input documents; and,
    storing said generated requested transcoded content in said cache storage in a manner in which said stored generated requested transcoded content can be retrieved by reference to said formed cache key.

7. The high-speed content transformation method of claim 6, wherein said forming step comprises the step of forming a cache key based upon one of a combination of uniform resource locators (URLs) which reference each of said input documents, a combination of document object model (DOM) hashes which reference each of said input documents, and a combination of a URL and DOM hash which reference individual ones of said input documents.

8. The high-speed content transformation method of claim 4, wherein said inspecting step comprises the step of inspecting a request for transcoded content to determine extensible markup language (XML) and extensible stylesheet (XSL) input documents required to produce said requested transcoded content.

9. A machine readable storage having stored thereon a computer program for performing a high-speed content transformation method, said computer program comprising a routine set of instructions for causing the machine to perform the steps of:
  inspecting a request for transcoded content to determine input documents required to produce said requested transcoded content;
  determining whether said input documents have been characterized as standalone, and further determining freshness criteria for said input documents which are determined to have been characterized as standalone;
  locating in cache storage previously generated transcoded content corresponding to said input documents determined to have been characterized as standalone; and,
  serving said previously generated transcoded content in response to said request rather than generating said requested transcoded content using said input documents where said previously transcoded content meets said freshness criteria.

10. The machine readable storage of claim 9, further comprising the steps of:
  generating said requested transcoded content using said input documents where either said previously transcoded content fails to meet said freshness criteria, where said previously generated transcoded content cannot be located in said cache storage, or where any one of said input documents has been characterized as not being standalone; and,
  caching said generated requested transcoded content in said cache storage.

11. The machine readable storage of claim 10, wherein said step of caching comprises the steps of:
  forming a cache key based upon identifiable characteristics of said input documents; and,
  storing said generated requested transcoded content in said cache storage in a manner in which said stored generated requested transcoded content can be retrieved by reference to said formed cache key.

12. The machine readable storage of claim 11, wherein said forming step comprises the step of forming a cache key based upon one of a combination of uniform resource locators (URLs) which reference each of said input documents, a combination of document object model (DOM) hashes which reference each of said input documents, and a combination of a URL and DOM hash which reference individual ones of said input documents.

13. The machine readable storage of claim 9, wherein said inspecting step comprises the step of inspecting a request for transcoded content to determine extensible markup language (XML) and extensible stylesheet (XSL) input documents required to produce said requested transcoded content.

* * * * *